US006767660B2

(12) United States Patent
Panik

(10) Patent No.: US 6,767,660 B2
(45) Date of Patent: Jul. 27, 2004

(54) DISTRIBUTOR SYSTEM AND METHOD FOR THE SUPPLY OF CONSUMERS

(75) Inventor: Ferdinand Panik, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 243 days.

(21) Appl. No.: 10/024,247

(22) Filed: Dec. 21, 2001

(65) Prior Publication Data

US 2002/0132148 A1 Sep. 19, 2002

(30) Foreign Application Priority Data

Mar. 15, 2001 (DE) .......................... 101 12 901

(51) Int. Cl.[7] .......................... H01M 8/06; H01M 8/04; B60S 5/02
(52) U.S. Cl. .............................. 429/17; 429/19; 429/34; 180/65.3; 137/234.6
(58) Field of Search .............................. 429/17, 19, 34; 180/65.3; 137/234.6

(56) References Cited

U.S. PATENT DOCUMENTS 6,065,511 A    5/2000  McClintock ................ 141/231
6,294,276 B1 *  9/2001  Ogino ........................ 429/17
6,458,478 B1 * 10/2002  Wang et al. ................. 429/17
2003/0059654 A1 *  3/2003  Hsu et al. ................ 429/19 X

FOREIGN PATENT DOCUMENTS

DE      3407881 A1    9/1985
WO    WO 00/69773    11/2000

OTHER PUBLICATIONS

European Search Report dated Nov. 7, 2003.

* cited by examiner

Primary Examiner—John S. Maples
(74) Attorney, Agent, or Firm—Crowell & Moring LLP

(57) ABSTRACT

Distributor systems supply a stationary fuel-cell system with a combustible via a combustible source. The stationary fuel-cell system is assigned to one or more buildings arranged in a stationary quarter. The distribution system serves for supplying the building or buildings with power and/or heat, and the distributor system has, in the stationary quarter, an extraction station, assigned to the combustible source, for supplying mobile consumers with a combustible or with a fuel extracted from the latter, the mobile consumers having a mobile fuel-cell system and a storage tank.

32 Claims, 3 Drawing Sheets

DISTRIBUTOR SYSTEM AND METHOD FOR THE SUPPLY OF CONSUMERS

BACKGROUND AND SUMMARY OF THE INVENTION

This application claims the priority of German Patent Document 101 12 901.7, filed in Germany, Mar. 15, 2001, the disclosure of which is expressly incorporated by reference herein.

The invention relates to a distributor system for the supply of consumers.

A precondition for the widespread use of fuel-cell vehicles is that the necessary infrastructure be sufficiently accessible. When methanol-operated fuel-cell vehicles are used, conversion measures may be necessary at filling stations, so that methanol can be offered for sale. When hydrogen-operated fuel-cell vehicles are employed, it is necessary to have a sufficient hydrogen infrastructure which can be reached without great effort even by the private operator of the fuel-cell vehicle.

The provision of a sufficient infrastructure of this kind for the supply of fuel-cell vehicles is cost-intensive and time-consuming. This means, however, that there is no guarantee that an appropriately equipped filling station for fuel-cell vehicles can be reached. Furthermore, in a transitional period when conventionally operated vehicles are to be supplied in large numbers, large quantities of stocks of a wide variety of fuels have to be kept in reserve at filling stations. It consequently becomes more difficult and more costly to introduce vehicles operated by fuel cells.

U.S. Pat. No. 6,065,511 A1 discloses a refuelling system for vehicles, in which, for example, commercial vehicles can be refuelled by means of a tanker in a similar way to aircraft being refuelled in the air by refuelling aircraft. For this purpose, vehicles are parked on a predetermined parking area. At the same time, a tanker is requested for this area and payment for refuelling is initiated. The vehicle can be refueled while the driver has left the vehicle and is performing other activities or is relaxing. Vehicle servicing is likewise possible. On leaving the area, the driver receives an inventory of the filling quantity and refueling costs.

An object on which the invention is based is to specify a distributor system for the supply of consumers, which makes a sufficient infrastructure available, without complicated conversion measures having to be carried out at filling stations.

This object is achieved according to preferred embodiments of the invention by providing a distributor system for the supply of a stationary fuel-cell system with a combustible via a combustible source, the stationary fuel-cell system being assigned to one or more buildings arranged in a stationary quarter and serving for supplying the building or buildings with power and/or heat, and the distributor system having an extraction station in the stationary quarter assigned to the combustible source for supplying mobile consumers with the combustible or with a fuel extracted from the latter, the mobile consumers having a mobile fuel-cell system and a storage tank.

According to the invention, an infrastructure for the supply of buildings with fuel, which is intended for the provision of power and/or heat for the buildings, is utilized for the supply of mobile consumers.

An advantage of the solution according to the invention is that there is no need for complicated conversions and investments at existing filling stations, since existing stationary systems can be used for the refueling of mobile consumers. At the same time, the refueling possibilities according to the invention are so widespread that they can easily be reached.

It should be understood without saying that the features mentioned above and those still to be explained below can be used not only in a combination specified in each case, but also in other combinations or alone, without departing from the scope of the present invention.

Other objects, advantages and novel features of the present invention will become apparent from the following detailed description of the invention when considered in conjunction with the accompanying drawings.

DETAILED DESCRIPTION OF THE DRAWINGS

The invention is suitable particularly for fuel-cell systems which are supplied with alcohols, hydrocarbons, ether or hydrogen, but it is not restricted to these combustibles.

Fuel-cell systems are attractive and compact energy supply systems which are also extremely suitable for stationary consumers. Such stationary consumers may be large consumers, such as, for example, power stations, or else small consumers, such as private households or businesses, which are supplied with electrical energy from fuel-cell systems. These necessarily require a supply in the form of storage tanks for a suitable combustible or in the form of a line network with sufficient capacity which transports a suitable combustible to the stationary consumers.

Figure 1:
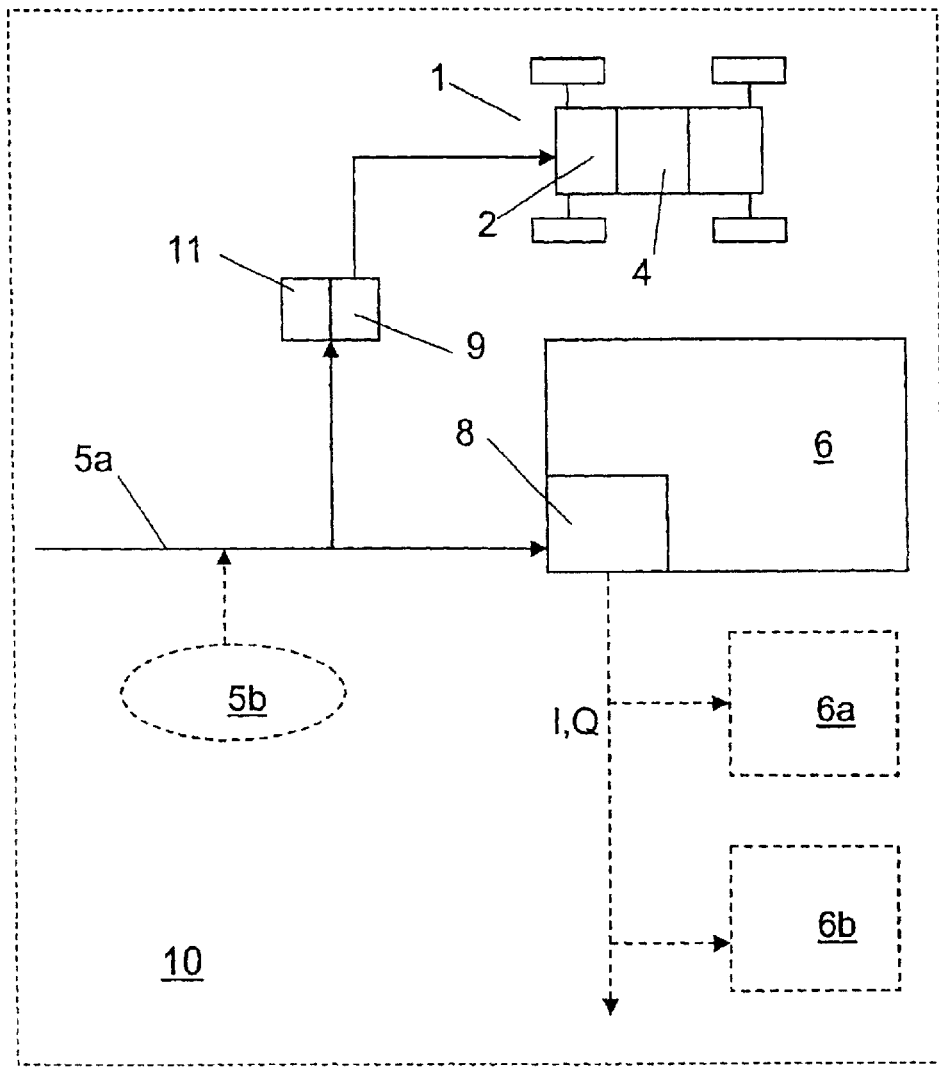
FIG. 1 shows a diagrammatic view of a distributor system with a stationary fuel-cell system constructed according to a preferred embodiment of the present invention.

FIG. 1 illustrates a preferred embodiment of the invention. A distributor system supplies a stationary combustible-cell system 8 in a building 6 with a combustible via a combustible source 5a, 5b. The stationary fuel-cell system 8 is assigned to one or more buildings 6, 6a, 6b in a stationary quarter 10 and serves for supplying the building or buildings 6, 6a, 6b with power I and/or heat Q. The distributor system in the stationary quarter 10 has an extraction station 9, assigned to the combustible source 5a, 5b, for the supply of mobile consumers 1 with the combustible or with a fuel extracted from the latter, the mobile consumers 1 having a mobile fuel-cell system 4 and a storage tank 2.

The quarter 10 may be, for example, a limited residential quarter, an industrial zone or a mixed residential and commercial area.

The combustible source 5a, 5b is assigned to the building 6, 6a, 6b and may be, for example, a reservoir 5b, in which a combustible is stored, or a media line 5a, by means of which a combustible is conveyed to the stationary consumer 6.

The combustible source 5a, 5b may be assigned further means 11, by which the extraction of combustible and/or fuel preferably for mobile consumers 1 and/or for stationary consumers 6 can be recorded and a form of payment carried out or initiated. Thus, the means 11 may comprise a card reader which can read credit cards or customer cards for refuelling or else cash, so that the combustible quantity extracted can be debited. The recording and/or payment means 11 are preferably connected to the extraction unit 9.

It is particularly beneficial if the distributor system delivers a combustible which can be used directly as a fuel by the fuel-cell systems 4, for example hydrogen for fuel cells with ion-conducting polymer membranes or, for example, natural gas for high-temperature fuel cells or other hydrogen carriers, such as petrol, alcohol, ether and the like.

Figure 2:
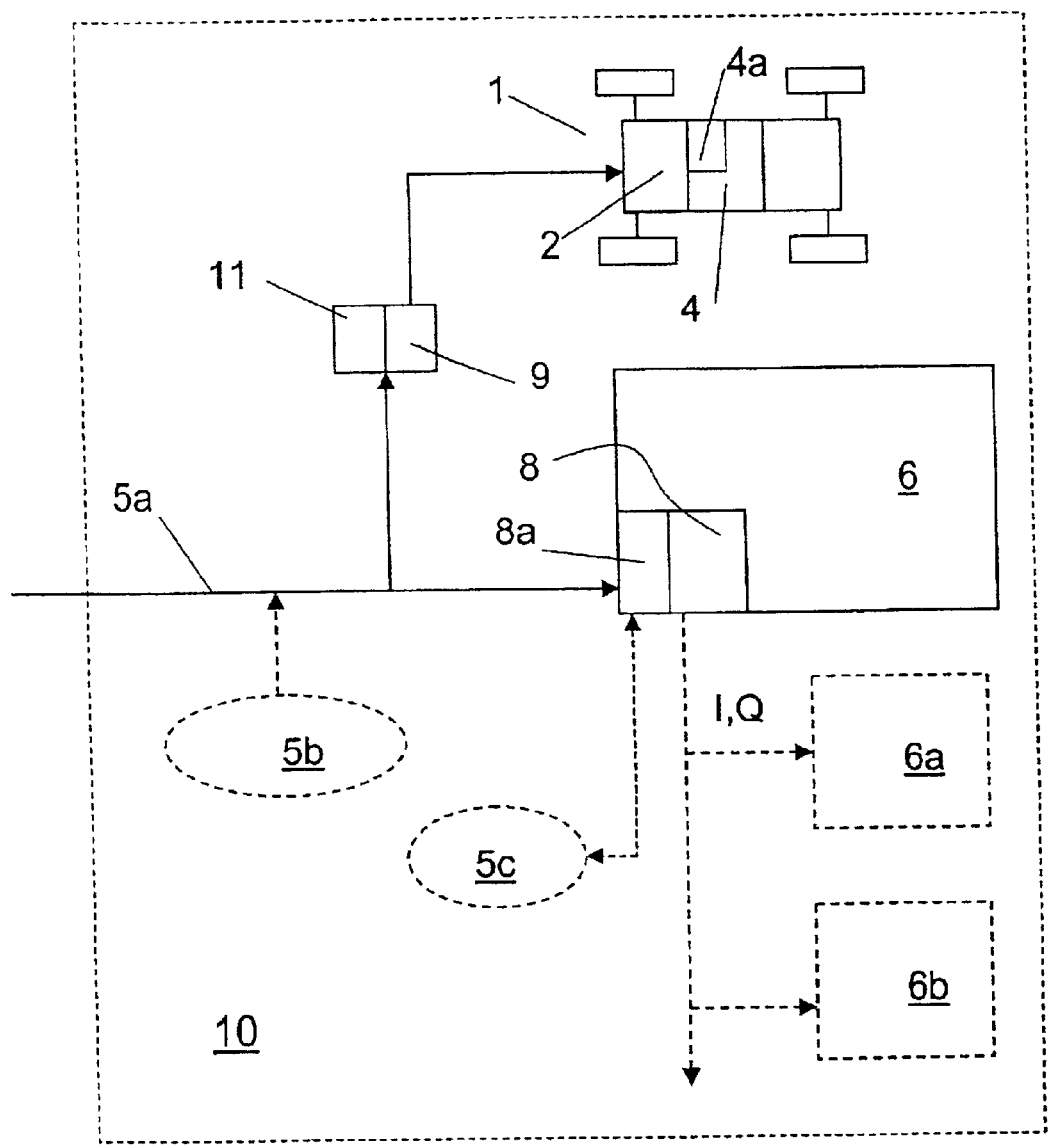
FIG. 2 shows a distributor system with a stationary fuel generation unit constructed according to a further preferred embodiment of the present invention.

FIG. 2 illustrates a further preferred embodiment of the invention. Identical components are designated by the same reference symbols as in FIG. 1. The stationary fuel-cell system 8 has a fuel generation unit 8a for extracting a fuel from the combustible. The fuel generation unit 8a is preferably a reforming plant or a device for the partial oxidation of the combustible.

The mobile consumer 1 may have a mobile fuel generation device 4a and may therefore, on board, extract a fuel for the supply of the fuel-cell unit of the mobile fuel-cell system 4 from the combustible which is refuelled into the mobile storage tank 2 from the combustible source 5a, 5b.

The stationary fuel generation unit 8a may be assigned a stationary fuel reservoir 5c which can store intermediately the fuel obtained in a stationary manner. This intermediately stored fuel may also be used for supplying mobile consumers 1.

This arrangement is advantageous when the combustible delivered via the distributor system cannot be used directly for supplying the mobile and/or stationary fuel-cell systems 4, 8 and the fuel first has to be extracted from it. Thus, hydrogen is first obtained, for example, from methanol or another combustible by the reforming or partial oxidation of methanol, before a fuel cell having an ion-conducting membrane can be operated with hydrogen. The stationary intermediate reservoir 5c may be used for refuelling with hydrogen those mobile consumers 1 which do not carry with them a mobile fuel generation device.

Figure 3:
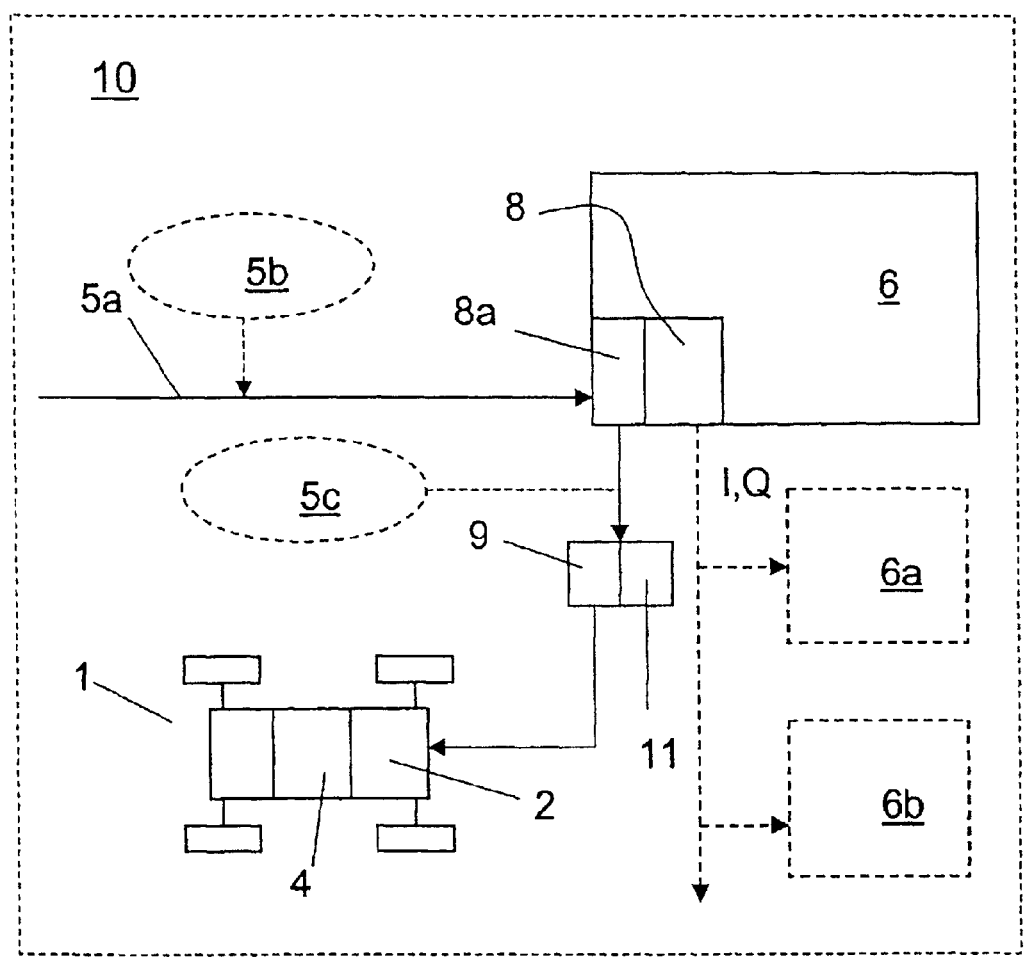
FIG. 3 shows a distributor system with the extraction of a fuel for mobile consumers constructed according to a further preferred embodiment of the present invention.

According to the further preferred embodiment shown in FIG. 3, a stationary fuel-cell system 8 with a stationary fuel generation device 8a is arranged in a building 6, 6a, 6b of the stationary quarter 10. Identical elements are designated by the same reference symbols as in FIG. 1 and FIG. 2. The extraction unit 9 is connected to the fuel generation unit 8a, so that the mobile consumer 1 can fill its supply tank 2 directly with the extracted fuel. Here, too, a stationary fuel reservoir 5c for the intermediate storage of the fuel extracted in a stationary manner may be provided, which can be used for supplying stationary and/or mobile fuel-cell systems 4, 8.

A central stationary fuel generation unit 8a is particularly advantageous when what are known as PEM fuel-cell systems are used, which are operated at low operating temperatures of around 100° C. and require the purest possible hydrogen as fuel. PEM fuel-cell systems are particularly beneficial for use in vehicles. For other systems which can operate at higher temperatures, a fuel cell may be operated directly even with the combustible. Thus, a high-temperature fuel cell can also be supplied directly by means of natural gas.

The arrangement according to FIG. 3 is advantageous when the mobile consumer 1 does not carry its own fuel generation device 4a with it in its mobile fuel-cell system 4.

Mobile consumers 1 may be vehicles or other consumers utilizing fuel-cell energy, for example electronic appliances, such as computers and the like.

It is particularly favorable for the combustible used to be natural gas. Natural gas is conventionally conveyed to stationary consumers 6 via long-distance lines 5a and/or is available in towns and villages in the form of relatively large reservoirs 5b. According to the invention, natural gas for the supply of mobile consumers 1 can be extracted on the spot from a central building supply, for example at a dwelling-house 6 supplied by a natural-gas line or at the village reservoir. A well developed distributor system for natural gas can therefore advantageously be utilized for the mobile fuel-cell infrastructure.

Distributor systems for other suitable media, such as, for example, petrol, petroleum, ether or alcohols, may, of course, also be utilized in the system and method according to the invention. It is consequently possible, via an existing line network for the supply of energy, to ensure the decentralized supply of fuel-cell vehicles, without a completely new infrastructure having to be built up.

Thus, for example, a private household in a building 6, which household is connected to a natural-gas line 5a in order to supply its stationary fuel-cell system 8 with natural gas, can readily deliver combustible in order to refuel its own fuel-cell vehicle 1 or else supply the neighbourhood in the quarter 10 with combustible for its fuel-cell vehicles or other consumers 1, or may function as a public filling station.

As a result, a reliable infrastructure for the decentralized supply of mobile consumers 1 with combustible is made available, without a complicated conversion of conventional petrol or diesel filling stations having to be carried out.

The solution according to the invention could supplement or replace the previous filling station infrastructure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Distributor system for the supply of a stationary fuel-cell system with a combustible via a combustible source, the stationary fuel-cell system being assigned to one or more buildings arranged in a stationary quarter and serving for supplying the building or buildings with power and/or heat, and the distributor system having an extraction station in the stationary quarter assigned to the combustible source for supplying mobile consumers with the combustible or with a fuel extracted from the latter, the mobile consumers having a mobile fuel-cell system and a storage tank.

2. Distributor system according to claim 1,
   wherein the combustible source is a line network assigned to the building and/or a reservoir.

3. Distributor system according to claim 1,
   wherein the stationary fuel-cell system has a fuel generation unit for extracting a fuel from the combustible.

4. System according to claim 3,
   wherein the extraction station is connected to the fuel generation unit.

5. System according to claim 3,
   wherein the fuel generation unit is assigned a fuel reservoir.

6. System according to claim 4,
   wherein the fuel generation unit is assigned a fuel reservoir.

7. System according to claim 1,
   wherein the extraction station is assigned means for initiating or carrying out recording and/or payment for combustible and/or fuel for the mobile consumers.

8. System according to claim 1,
wherein there is arranged in a building of the stationary quarter a stationary fuel-cell system which serves for supplying a plurality of buildings of the stationary quarter with power and/or heat.

9. A fuel distribution system for vehicles with fuel-cell operated power drives, comprising:
a stationary quarter with at least one building assigned a stationary fuel-cell system;
a building fuel distribution system operable to supply building fuel to said stationary fuel-cell system in said stationery quarter for operating at least one of heat and power systems for the at least one building; and
an extraction station located in said stationary quarter operable to extract a portion of the fuel from the building fuel for supplying fuel-cell operated vehicles with said portion as vehicle fuel.

10. A fuel distribution system according to claim 9,
wherein said building fuel distribution system includes a line network supplying said stationary quarter and other fixed locations.

11. A fuel distribution system according to claim 9,
wherein said building fuel is stored in a stationary reservoir at said stationary quarter.

12. A fuel distribution system according to claim 9,
wherein said extraction station includes a means for separating said fuel from the building fuel distribution system into a component especially adapted to serve as fuel for fuel-cell operated vehicles.

13. A fuel distribution system according to claim 9,
wherein said building fuel is natural gas.

14. A fuel distribution system according to claim 10,
wherein said building fuel is natural gas.

15. A fuel distribution system according to claim 11,
wherein said building fuel is natural gas.

16. A fuel distribution system according to claim 9,
wherein said fuel of said building fuel is methanol.

17. A fuel distribution system according to claim 9,
wherein said extraction station includes means for extracting hydrogen from said building fuel to serve as said vehicle fuel.

18. A fuel distribution system according to claim 9,
wherein said building fuel is one of petrol, alcohol, and ether.

19. A fuel distribution system according to claim 9,
wherein said vehicle fuel is hydrogen.

20. A fuel distribution system according to claim 14,
wherein said extraction station includes means for extracting hydrogen from said building fuel to serve as said vehicle fuel.

21. A fuel distribution method for supplying vehicles with fuel-cell operated power drives, comprising:
supplying building fuel to a stationery quarter for operating a stationary fuel-cell system assigned to operate at least one of heat and power systems for at least one building located in said stationary quarter; and
operating an extraction station located in said stationary quarter to extract a portion of the fuel from the building fuel for supplying fuel-cell operated vehicles with said portion as vehicle fuel.

22. A fuel distribution method according to claim 21:
wherein said building fuel distribution system includes a line network supplying said stationary quarter and other fixed locations.

23. A fuel distribution system according to claim 21,
wherein said fuel of said building fuel is stored in a stationary reservoir at said stationary quarter.

24. A fuel distribution system according to claim 21,
wherein said extraction station includes a means for separating said fuel from the building fuel distribution system into a component especially adapted to serve as fuel for fuel-cell operated vehicles.

25. A fuel distribution system according to claim 21,
wherein said building fuel is natural gas.

26. A fuel distribution system according to claim 22,
wherein said building fuel is natural gas.

27. A fuel distribution system according to claim 23,
wherein said building fuel is natural gas.

28. A fuel distribution system according to claim 21,
wherein said building fuel is methanol.

29. A fuel distribution system according to claim 21,
wherein said extraction station includes means for extracting hydrogen from said building fuel to serve as said vehicle fuel.

30. A fuel distribution system according to claim 21,
wherein said building fuel is one of petrol, alcohol, and ether.

31. A fuel distribution system according to claim 21,
wherein said vehicle fuel is hydrogen.

32. A fuel distribution system according to claim 25,
wherein said extraction station includes means for extracting hydrogen from said building fuel to serve as said vehicle fuel.

* * * * *